Oct. 13, 1931.  T. G. LOUIS  1,827,323
MAGNETO
Filed Jan. 29, 1930  2 Sheets-Sheet 1
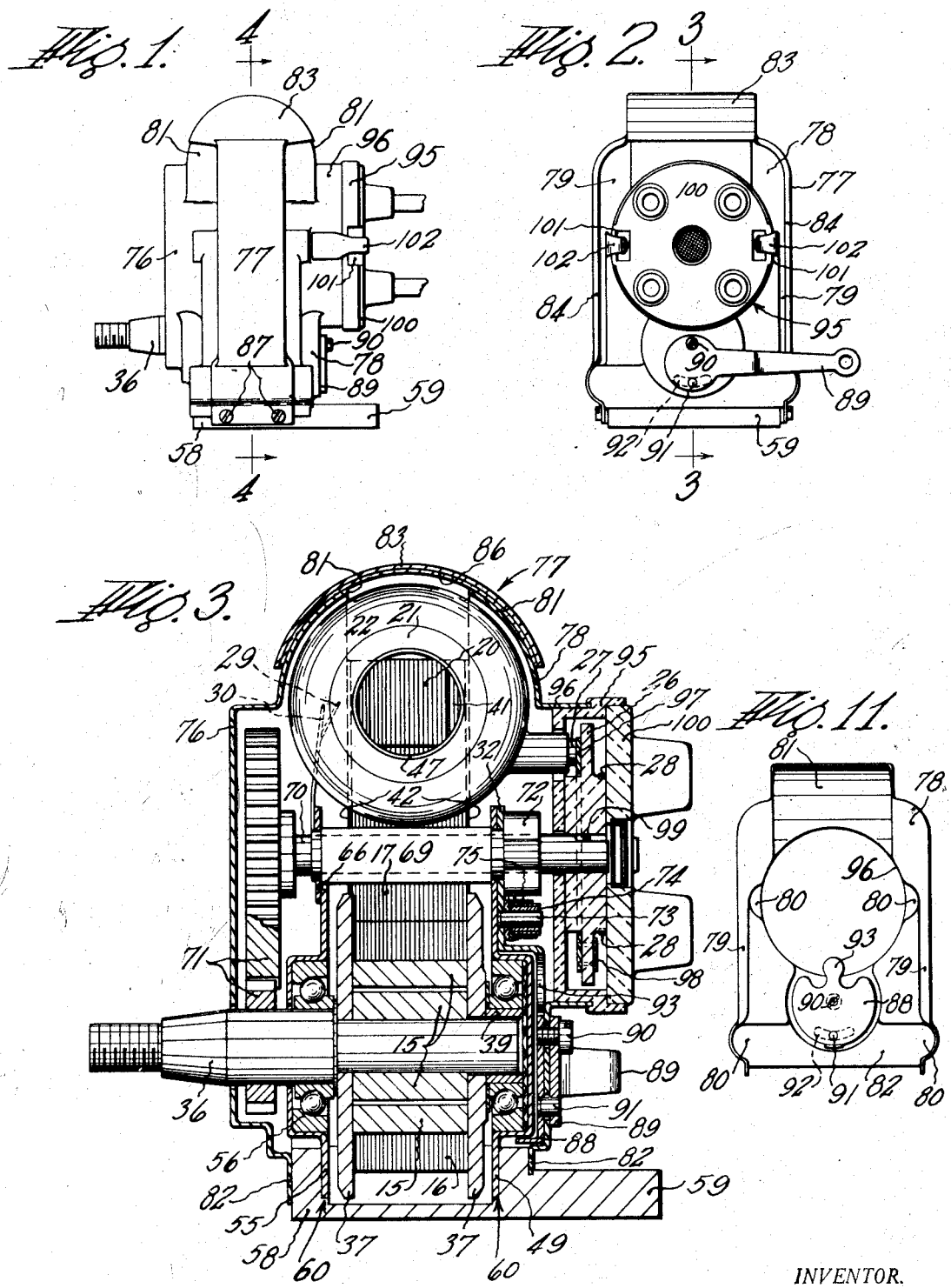
INVENTOR.
Terrence G. Louis
BY Chapin & Neal
ATTORNEYS.

Oct. 13, 1931.  T. G. LOUIS  1,827,323
MAGNETO
Filed Jan. 29, 1930  2 Sheets-Sheet 2
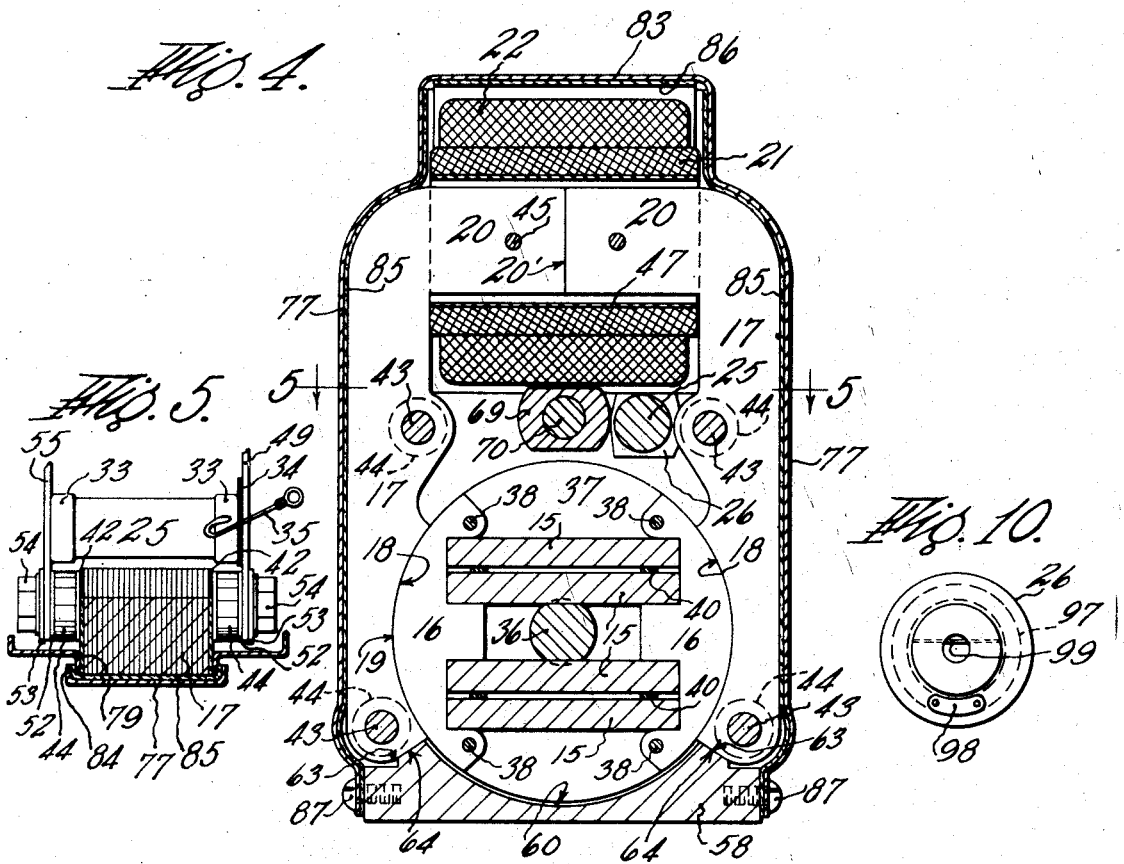
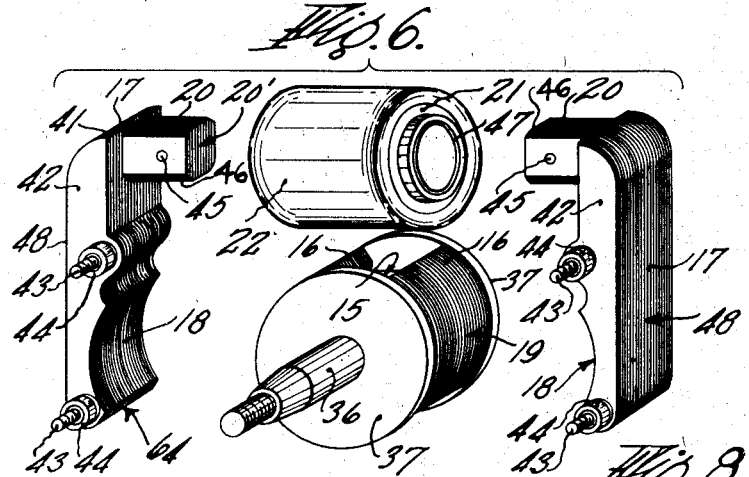
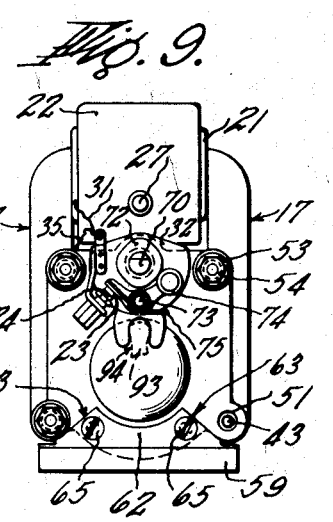
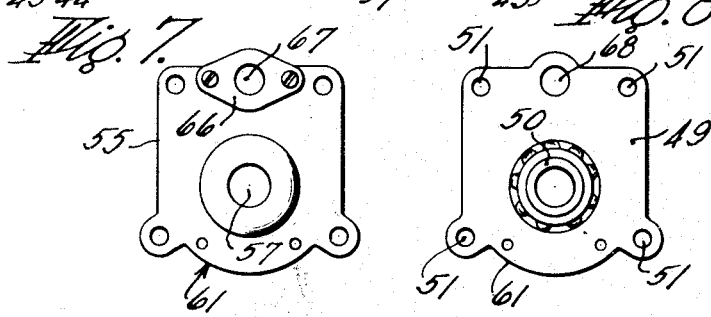
INVENTOR.
Terrence G. Louis
BY Chapin & Neal
ATTORNEYS.

Patented Oct. 13, 1931

1,827,323

UNITED STATES PATENT OFFICE

TERRENCE G. LOUIS, OF WEST SPRINGFIELD, MASSACHUSETTS, ASSIGNOR TO WICO ELECTRIC COMPANY, OF WEST SPRINGFIELD, MASSACHUSETTS, A CORPORATION OF MASSACHUSETTS

MAGNETO

Application filed January 29, 1930. Serial No. 424,365.

This invention relates to improvements in magnetos of the type which include a rotary magnetic source and stationary core and coil structure.

The general object of the invention is to provide a magneto of the aforesaid type which is of improved construction, enabling a small, compact but highly efficient machine and one which can be manufactured at low cost.

A particular object of the invention is to provide in a magneto of this type a rotor of improved construction, characterized by a particular disposition and arrangement of the component parts, whereby a strong, compact and efficient construction is obtained and one susceptible to manufacture at low cost.

Another object of the invention is to provide a magneto which is so designed that it can be made up largely from parts formed in a punch press, and in any event without any parts which are expensive to manufacture, and which is also so designed that these parts can be easily and quickly assembled.

Other objects and advantages relate to improvements in details and will appear as the detailed description proceeds.

The invention will be disclosed with reference to the accompanying drawings, in which:—

Figs. 1 and 2 are small scale, front and end exterior elevational views of a magneto embodying my invention;

Fig. 3 is a cross sectional view taken on the line 3—3 of Fig. 2;

Fig. 4 is a sectional elevational view taken on the line 4—4 of Fig. 1;

Fig. 5 is a fragmentary sectional plan view taken on the line 5—5 of Fig. 4;

Fig. 6 is a perspective view showing the coils and the several elements of the magnetic field structure prior to assembly;

Figs. 7 and 8 are elevational views showing the non-magnetic end plates which serve to hold the parts, shown in Fig. 6, in assembled relation;

Fig. 9 is an end elevational view, taken from the same direction as Fig. 2 and showing the elements of Figs. 6, 7 and 8 assembled and secured to the base plate;

Fig. 10 is an elevational view of the movable member of the distributor; and

Fig. 11 is an elevational view showing the interior of one of the end casing sections.

The magneto includes a rotatable source of magnetic flux, comprising permanent magnets 15 (Fig. 4), with which are associated laminated pole shoes 16. Stationary laminated elements 17, made in two sections, afford concavely curved surfaces 18, forming pole shoes, to cooperate with the similarly but convexly curved surfaces 19 of the shoes 16. These elements also afford sections 20 which abut end to end and together form a complete core. Primary and secondary coils 21 and 22, the one surrounding the other, encompass the core afforded by the two abutting sections 20. A suitable interrupter (Fig. 9) is provided which includes relatively movable breaker points 23 and 24. A suitable condenser 25 (Fig. 5) is provided as well as a suitable distributer element 26 (Figs. 3 and 10) for distributing the high tension current from the high tension terminal 27 of the secondary coil successively to a plurality of high tension terminals 28 (four in this case), of which two are seen in Fig. 3. One terminal of the primary coil and one terminal of the secondary coil are connected by wires 29 and 30, respectively (Fig. 3) to the frame of the machine. The other terminal of the primary coil is connected by a wire 31 (Fig. 9) to the breaker point 24, which is fixed to and insulated from a supporting plate 32. The condenser 25 has metallic end terminals 33, like those of a cartridge fuse, and one of these is in metallic contact with the frame of the machine while the other is insulated from the frame at 34 (Figs. 4 and 5) and connected by a wire 35 to the breaker point 24 (Fig. 9).

The elements thus far described cooperate in the usual manner. The magnetic rotor varies the flux through the elements 17. The flux passes through these elements in one direction, is then decreased and subsequently passed through the elements in an opposite direction, followed by another decrease of flux. An electromotive force is induced in the primary coil 21. This coil is normally in a closed electric circuit controlled by the breaker points 23 and 24, which open at the proper times (twice each revolution as shown) and induce a high tension current in the secondary coils. The high tension current is distributed by the element 26 to the high tension terminals 28 or in any other usual and suitable way.

The rotor construction is important. For one thing, the arrangement of parts is such as to enable the use of a single shaft, as distinguished from two end trunnions, as a means for rotatably supporting the rotor. The magnets 15 are segregated into two groups (Fig. 4), which are spaced apart sufficiently to enable the drive shaft 36 to pass between them. The long dimension of each magnet lies crosswise with respect to the axis of shaft 36, an arrangement made commercially feasible by the use of special alloy steels, such a cobalt steel for example, whereby the desired flux values can be obtained with short magnets, such as here shown. A compact magnetic rotor results and one of small diameter and short length. An important feature is that the broad faces of the magnets are disposed in planes parallel to the axis of shaft 36, as distinguished from crosswise thereof. The magnets are stacked in a radial, rather than in an axial direction and this enables each magnet to feed into every lamination of the shoes 16. It also enables the separation of the magnets into groups to enable shaft 36 to pass between them. This shaft may be slabbed off, as shown in Fig. 4, to provide for a flat bearing on the inner face of the inner magnet of each group. This does no harm, because the contact is along the neutral area of the magnets, and it may be utilized to advantage as an aid in driving the rotor.

The laminations of shoes 16 are clamped between two circular discs 37 (Fig. 3) of non-magnetic material and secured by rivets 38 (Fig. 4) passing through both discs and the laminations. The shaft passes through both discs and is suitably connected thereto so as to rotate therewith. The shaft, in that portion which passes through the discs 37, is of smaller diameter than the left hand bearing portion, as shown in Fig. 3, and the right hand end of the shaft has driven onto it a bushing 39 which affords a right hand bearing portion equal in diameter to the left hand bearing portion. The laminations of shoes 16 are recessed, as shown in Fig. 4, to receive the polar ends of the magnets and the magnets are firmly held in these recesses by wedges 40. Each shoe 16 has connected thereto magnet ends of like polarity. The shoes are substantially ninety degrees in angular extent,—being shown slightly greater to provide a slight overlap with the surfaces 18, when the rotor is turned ninety degrees from the illustrated position. The surfaces 18, as shown, are substantially ninety degrees in angular extent.

The rotor, during rotation, is subjected to severe strains and shocks,—the resistance to movement of the rotor being irregular due to magnetic pull. Consequently, a strong rugged construction is required for the rotor and a strong rugged drive shaft. With the arrangement illustrated, the shaft has a driving connection with both discs 37 and also with the magnets 15, so that ample area of driving contact is secured to take care of the intermittently heavy torque.

Referring now to the stationary elements 17, these are made up in two like and interchangeable sections, avoiding the necessity for rights and lefts. Two types of laminations are used for each element 17. The majority of laminations are roughly L-shaped, as shown in Fig. 4 but, since the core 20 is narrower than the magnets 15, it is desirable to build out each side by substantially straight laminations such as 41 (Figs. 3 and 6). All the laminations necessary for one unit are assembled into a group and insulating strips 42 are placed one on each side of the group. Two studs 43 are then passed through the members of the group and the members are tightly clamped by nuts 44, threaded one on each end of each stud. The laminations may also be further secured together by rivets, of which one is shown at 45 in Fig. 6 as clamping the laminations of the core section 20. The sections 20 are then bevelled, as at 46, to enable them to be slipped into the insulating core 47 of the primary coil 21. Each group of laminations has one flat side 48 and this is laid down on the bed of the finishing machine while the surfaces 18 and 20' are finished. These surfaces are ground or otherwise finished,—the surface 18 being curved from a center which lies in the same vertical plane as the surface 20' and with a radius just slightly in excess of the radius of the pole shoe surfaces 19 of the rotor. With this accomplished, the parts are ready for assembly.

To facilitate assembly, a dummy rotor is used which consists of a cylinder equal in diameter to twice the radius of curvature of surfaces 18 and having a shaft of the same size as shaft 36. The core sections are slipped into opposite ends of core 47 and the dummy rotor is slipped in between the two surfaces 18 and such surfaces forced tightly against the periphery of the dummy rotor. At the same time, the core sections 20 are forced into abutment. An end plate 49 is then slipped over the four studs 43 and one end of the shaft of the dummy rotor is slipped into the ball bearing 50 provided in plate 49. The holes 51 in this plate are larger than the studs (see Fig. 9) so as to enable the plate to be shifted somewhat, if necessary, and so as to keep the plate out of metallic contact with the studs. Insulating washers 52 (Fig. 5) are placed on the studs prior to the plate, and other insulating washers 53 placed on the stud after the plate has been applied thereto. Then nuts 54 are threaded onto the studs to firmly clamp the plate in place. As a result of this operation, the two stationary elements 17 have been clamped to plate 49 and this plate has been located so that its bearing 50 is correctly centered with reference to surfaces 18. The dummy rotor is then removed and the illustrated rotor is substituted for it. Then the other plate 55 (Fig. 7) is applied to the other ends of studs 43,—insulating washers being used, such as 52 and 53 as before, and nuts 54 being used to clamp the parts in place. The plate 55 has holes 51 like those of plate 49 which are larger than studs 43. The idea is to insulate plates 49 and 55 from the laminations and break up what would otherwise be a continuous ring in which current might flow. Plate 55 has a ball bearing 56 to receive shaft 36 and a hole 57 to permit the shaft to extend therethrough for connection to the driving source. The magneto, except for the accessories, is now completely assembled.

The base plate 58 (Fig. 3), except for a small shelf 59 which enables attachment of the magneto to an engine, is not greatly different in area from the base area of the assembly just described. It is milled out to afford a part-cylindrical recess into which the rotor may extend, as shown in Fig. 4. Curved shoulders 60 (Figs. 3 and 4) are provided adjacent each vertical side wall of this recess to conform to the curved surfaces 61 (Figs. 7 and 8) on the end plates 49 and 55. These plates closely fit in the recess and lie contiguous with the adjacent side walls thereof and the rounded surfaces 61 of the plates rest on shoulders 60. The base plate has two upstanding transversely-extending ears 62 and longitudinally bevelled surfaces 63 (Fig. 9), and the laminations of the elements 17 have bevelled surfaces 64 (Fig. 6) which abut the ends 63 as will be clear from Fig. 4. The unit, assembled, as above described, can thus be set into the recess of the base plate and be properly located thereon and also so supported that it can be adequately held to the base plate by four small screws 65, applied two through each ear 62 and threading into holes in the adjacent end plate 49 or 55.

Before plate 55 is finally clamped in place, the condenser 25 is slipped in place between plates 49 and 55, so that it will be firmly clamped when plate 55 is finally secured in place.

Plate 55 (Fig. 7) has a removable piece 66 with a central hole 67 and plate 49 (Fig. 8) has a similarly located hole 68. A bearing member 69 (Fig. 3) fits between the plates 49 and 55 and has shouldered down ends to enter the holes described. The bearing, as will be clear, is firmly held in place, being clamped between the plate 49 and the removable part 66 of plate 55. This bearing supports a shaft 70 for operating the interrupter and distributor. Shaft 70 is driven at the desired speed relative to rotor shaft 36,—in this instance at one half the speed of shaft 36,—by intermeshing spur gears 71.

The interrupter parts are all carried by a plate 32 (Fig. 9) which is pivotally supported from shaft 70 and which lies contiguous with the outer face of plate 49 (Fig. 3). A cam 72 is forced on shaft 70 and the plate 32 is held in axial position between this cam and plate 49. The plate 32 is free to turn around shaft 70 and means, to be later described, are provided for turning the plate for timing purposes. Plate 32 carries a stud 73 (Fig. 9) which pivotally supports the interrupter lever 74 on one end of which the movable breaker point 23 is mounted. The other end of lever 74 is adapted to ride on cam 72 and is held thereagainst by a suitable spring 75. The cam 72 is arranged to move lever 74 against the tension of spring 75 and separate the breaker points four times during each revolution or twice during each revolution of the rotor.

After the interrupter has been assembled, the next step is to apply the enclosing casing, which serves also to support the distributor and the timing lever. This casing is made in three pressed-metal sections 76, 77 and 78 (Fig. 1). The sections 76 and 78 have vertically extending flanges 79, as shown in Figs. 2 and 11 in connection with the section 78, and these flanges abut the insulating strips 42 on the end faces of the laminated field structure (Fig. 5). These sections are, however, pressed out, as shown at 80 in Fig. 11, to clear the studs 43 and the nuts 44 and 54. They are also pressed out wherever necessary to clear other parts, as for example at the part-cylindrical surface 81, which lies adjacent to but out of contact with coil 22. The only contact with parts of the machine, except the base 58, is along the flanges 79 and these are insulated by the strips 42. There is a flange 82 to abut the ears 62 of base 58. With these two casing sections slipped in place, the third casing section 77 is applied. Section 77 is roughly U-shaped (Figs. 2 and 4) and has a semi-cylindrical upper end 83 (Figs. 1 and 3) to overlie the parts 81 of sections 76 and 78. Section 77 also has marginal inturned flanges 84 (Figs. 2 and 5) to engage and retain the flanges 79 of the sections 76 and 78. Insulating strips 85 and 86 are provided, the former insulating the casing section 76 from the field structure and from the flanges 79 and the base plate, and the latter insulating the semi-circular part 83 from the adjacent parts 80. Thus, the casing 77 holds casings 76 and 78 in place and casing 77 is held in place by securing its lower ends by screws 87 to base 58.

The purpose of the insulation, heretofore described, is to break up any complete metallic loops which might otherwise be formed around the core or other part of the magnetic circuit. Any such loop, if present, would function like a short-circuited turn of a winding and would have a choking effect tending to restrain changes of flux in the magnetic circuit. Thus, considering Fig. 4, the casing 77 with base 58 would form a complete metallic loop but for the insulation 85. So also, in Fig. 3, the part 83 and the end casings 76 and 78, together with base 58, would form a metallic loop but for the insulation 86. The casings 76, 77 and 78 would also form a metallic loop having a vertical axis but for the strips 85 which lie between the flanges 79 and 84. For like reasons, the end plates 49 and 55 are insulated from the field members.

The timing mechanism is mounted in casing 78. It consists of a disc 88 (Fig. 11) in contiguous relation with the inner face of casing 78 (Fig. 3) and a lever 89 in contiguous relation with the outer face of the casing. The parts 88 and 89, as here shown, are connected by a screw 90, which is free to turn in casing 78, but they may be connected in any other suitable way so as to turn together. Lever 89 and disc 88 are also connected by a pin 91 which passes through an arcuate slot 92 (Fig. 11) in casing 78. The slot 92 limits the movement of the timing lever. Disc 88 has an integral ear 93 which engages in a slot 94 (Figs. 3 and 9) in the supporting plate 32 of the interrupter. Thus, by turning lever 89, the interrupter may be bodily moved about the axis of shaft 70.

The distributer is mounted for convenient removal in casing 78. The distributer includes an externally-flanged, cylindrical cup-like housing 95 (Fig. 3) of insulating material which slips into the cylindrical sleeve-like part 96 of casing 78, the externally flanged part of the housing seating against the rim of part 96. This housing has holes through which the high tension terminal 27 and shaft 70 pass. The distributer element 26, shown in Fig. 10, is then slipped into the housing and engaged with shaft 70, as indicated in Fig. 3. The element 26 is a disc of insulating material, having on its inner face a metal ring 97 (Fig. 10) to cooperate with high tension terminal 27 and on its outer face a metal segment 98 to cooperate successively with the distributer terminals 28. Disc 26 has a hole to fit shaft 70 and is held to the shaft by a pin 99 in the disc which engages the flattened outer end of the shaft, as clearly shown in Fig. 3. The terminals 28 are carried by a cap 100 of insulating material which seats in a recess in housing 95 and holds disc 26 in axial position. Cap 100 has ears 101 (Fig. 2) which interlock with housing 95 in the usual way to locate the cap properly with respect thereto. Spring hooks 102, pivoted to casing 78, are adapted to bear on cap 100, as clearly shown in Figs 1 and 2, and hold the latter in place in housing 95 and the housing in place in casing 78.

In operation, the breaker points 23 and 24 are arranged to separate twice during each revolution of the rotor and to remain open for a short interval. The earliest time that the breaker points can open is when the rotor is in a position approximately at right angles to that shown and, due to the substantial range of timing adjustment, they can open at a considerably later time. The breaker points open at a time when the pole shoes of the magnets are engaged one with each stationary pole shoe 18 and magnetic flux builds up in the elements passing therethrough in one direction. As the rotor continues to turn, the breaker points close and the choking effect of the now closed-circuited primary winding 21 tends to restrain a flux change while the rotor turns to a position in which that pole shoe 16 which was engaged with one shoe 18 becomes engaged with the opposite shoe 18. The breaker points then separate and flux builds up in the magnetic circuit in an opposite direction. A large change in flux is obtained, due to the reversal, and this flux change induces an electromotive force in the winding 22. The intermittent electromotive forces thus induced are distributed by the segment 98 successively to the terminals 28.

The magneto construction, herein described, possesses important manufacturing advantages. Most of the parts are of a sort which can be made in a punch press and thus in quantities at low unit cost. The laminations, side plates 49 and 55, and the several casing sections are all of this character. There are no parts which present manufacturing complications, and none which are expensive to manufacture. The assembly of parts, as will be appreciated from the preceding detailed description, is not difficult and as a result the magneto may be produced at low cost and marketed at a low price.

Aside from the manufacturing advantages, a small, compact but highly efficient machine is afforded. The utilization of efficient short bar magnets is made possible by the use of special alloy steels, which enables the rotor to be of small diameter. The small clearance between the rotor and the stationary field frame cuts down the air gap losses to a minimum and enables a more efficient utilization of the flux of the magnets. The reversal of flux through the core provides for a relatively great change of flux through the generating coil and a most effective spark is obtained with a comparatively small amount of material because of the efficient way in which such material is utilized. The compactness of the structure will readily be appreciated from an inspection of Figs. 3 and 4 and its small size will be appreciated when it is stated that these figures are full size.

The rotor construction, while simple and cheap to manufacture, is nevertheless strong and rugged to resist the strains to which it is necessarily subjected in operation. The particular disposition of the magnets of the rotor is important and advantageous for the reasons hereinbefore pointed out in full detail. It is not necessarily essential that the member 36 be used for driving the rotor. The important thing is that such member assists in rotatably supporting the rotor and this it may do either in the manner shown or in various other equivalent ways, which will readily occur to those skilled in the art. I prefer to consider the member 36 as a supporting member for the rotor rather than as a drive shaft in the usual strict sense of the word. It need not necessarily be a shaft at all in the ordinary sense but, whatever its form, it will serve in rotatably supporting the rotor.

The invention has been disclosed herein, in an embodiment at present preferred, for illustrative purposes, but the scope of the invention is defined by the appended claims rather than by the foregoing description.

What I claim is:

1. A rotor for a magneto, comprising a pair of spaced pole shoes, spaced bar magnets connecting the pole shoes and forming therewith a four sided enclosure, heads of non-magnetic material between which said shoes and magnets are clamped and forming ends to box in said enclosure, and a supporting member passing through said heads and enclosure and between the spaced magnets and between the spaced shoes, said member having diametrically opposite flat surfaces to engage the magnets adjacent the neutral line thereof.

2. In a magneto, two stationary sections each built up of similar and approximately L-shaped laminations and each affording a core part and a complete pole shoe, said core parts abutting end to end to form a complete core and define the proper spacing between said shoes, a coil on said core, and a rotor including a magnet and pole shoes therefor mounted to turn in the space between said stationary pole shoes.

3. In a magneto, a stationary structure built up of laminations and forming a core and two spaced pole shoes, a rotor mounted between said shoes, a driving shaft for the rotor, end plates having bearings to support said shaft and located one adjacent each end face of the rotor, means for clamping said laminations between said end plates, and a base to which said end plates are detachably secured, whereby all working parts of the magneto may be assembled independently of the base and applied as one unit thereto.

4. In a magneto, two groups of approximately L-shaped laminations, means for binding the laminations of each group together and affording threaded studs projecting from opposite end faces of the group, each said group forming part of a core and a connected pole shoe, said groups assembled with the core parts engaging and in the form of an inverted U, a rotor disposed between said pole shoes, a drive shaft for the rotor, end plates for tying said two groups together and for supporting said shaft, said plates disposed one on each side of the rotor and one adjacent each said end face, said studs extending through said end plates, and nuts on the studs for securing the plates.

5. In a magneto, two groups of approximately L-shaped laminations, means for binding the laminations of each group together and affording threaded studs projecting from opposite end faces of the group, each said group forming part of a core and a connected pole shoe, said groups assembled with the core parts engaging and in the form of an inverted U, a rotor disposed between said pole shoes, a drive shaft for the rotor, end plates for tying said two groups together and for supporting said shaft, said plates disposed one on each side of the rotor and one adjacent each said end face, said studs extending through said end plates, nuts on the studs for securing the plates, and means for insulating each end plate from said groups of laminations.

6. In a magneto, two groups of approximately L-shaped laminations, means for binding the laminations of each group together and affording threaded studs projecting from opposite end faces of the group, each said group forming part of a core and a connected pole shoe, said groups assembled with the core parts engaging and in the form of an inverted U, a rotor disposed between said pole shoes, a drive shaft for the rotor, end plates for tying said two groups together and for supporting said shaft, said plates disposed one on each side of the rotor and one adjacent each said end face, said studs extending through said end plates, nuts on the studs for securing the plates, and a base to which said end plates are detachably secured.

7. In a magneto, a stationary laminated structure of approximately the shape of an inverted U, the cross bar portion of which forms a core and the legs of which form pole shoes, two end plates of non-magnetic material for interconnecting the two pole shoes, a rotor disposed between said shoes and between said plates and supported by said plates, a base to which said plates are secured, end casing sections each having a pair of marginal flanges to abut the leg sections of said laminated structure and disposed one adjacent each end plate, an intermediate casing section of roughly the form of an inverted U having a cap part to overlie the upper ends of the two end casing sections and inturned marginal flanges to overlap the marginal flanges of said end sections and means for securing the lower ends of the intermediate casing section to said base.

8. In a magneto, a stationary laminated structure of approximately the shape of an inverted U, the cross bar portion of which forms a core and the legs of which form pole shoes, two end plates of non-magnetic material for interconnecting the two pole shoes, a rotor disposed between said shoes and between said plates and supported by said plates, a base to which said plates are secured, end casing sections each having a pair of marginal flanges to abut the leg sections of said laminated structure and disposed one adjacent each end plate, an intermediate casing section of roughly the form of an inverted U having a cap part to overlie the upper ends of the two end casing sections and inturned marginal flanges to overlap the marginal flanges of said end sections, means for securing the lower ends of the intermediate casing section to said base, and means for insulating said casing sections one from another.

9. In a magneto, a stationary laminated structure of approximately the shape of an inverted U, the cross bar portion of which forms a core and the legs of which form pole shoes, two end plates of non-magnetic material for interconnecting the two pole shoes, a rotor disposed between said shoes and between said plates and supported by said plates, a base to which said plates are secured, end casing sections each having a pair of marginal flanges to abut the leg sections of said laminated structure and disposed one adjacent each end plate, an intermediate casing section of roughly the form of an inverted U having a cap part to overlie the upper ends of the two end casing sections and inturned marginal flanges to overlap the marginal flanges of said end sections, means for securing the lower ends of the intermediate casing section to said base, and means for insulating said casing sections one from another and from said laminated structure.

10. In a magneto, a stationary laminated structure of approximately the shape of an inverted U, the cross bar portion of which forms a core and the legs of which form pole shoes, two end plates of non-magnetic material for interconnecting the two pole shoes, a rotor disposed between said shoes and between said plates and supported by said plates, a base to which said plates are secured, end casing sections each having a pair of marginal flanges to abut the leg sections of said laminated structure and disposed one adjacent each end plate, an intermediate casing section of roughly the form of an inverted U having a cap part to overlie the upper ends of two end casing sections and inturned marginal flanges to overlap the marginal flanges of said end sections, means for securing the lower ends of the intermediate casing section to said base, and insulation between said marginal flanges of the end casing sections and the marginal flanges of the intermediate section.

11. In a magneto, a stationary laminated structure of approximately the shape of an inverted U, the cross bar portion of which forms a core and the legs of which form pole shoes, two end plates of non-magnetic material for interconnecting the two pole shoes, a rotor disposed between said shoes and between said plates and supported by said plates, a base to which said plates are secured, end casing sections each having a pair of marginal flanges to abut the leg sections of said laminated structure and disposed one adjacent each end plate, an intermediate casing section of roughly the form of an inverted U having a cap part to overlie the upper ends of the two end casing sections and inturned marginal flanges to overlap the marginal flanges of said end sections, means for securing the lower ends of the intermediate casing section to said base, and insulation between said intermediate casing section and said base.

12. In a magneto, a laminated structure in approximately the form of an inverted U, the cross bar portion of which forms a core and the two legs pole shoes, a coil on said core, a rotor between said shoes, a drive shaft for the rotor, end plates having bearings to support said shaft and secured to said structure one adjacent each end face thereof, a bearing clamped in place between said plates and located between the core and rotor with its axis at right angles to that of the core, and a timer shaft mounted in said bearing driven from the rotor shaft.

13. In a magneto, a laminated structure in approximately the form of an inverted U, the cross bar portion of which forms a core and the two legs pole shoes, a coil on said core, a rotor between said shoes, a drive shaft for the rotor, end plates having bearings to support said shaft and secured to said structure one adjacent each end face thereof, a bearing clamped in place between said plates and located between the core and rotor with its axis at right angles to that of the core, and a distributer shaft mounted in said bearing driven from the rotor shaft.

In testimony whereof I have affixed my signature.

TERRENCE G. LOUIS.